(12) United States Patent
Woods

(10) Patent No.: US 8,137,129 B2
(45) Date of Patent: Mar. 20, 2012

(54) VEHICULAR RETRACTABLE CABLE SYSTEMS

(75) Inventor: Don Lenere Woods, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/850,675

(22) Filed: Aug. 5, 2010

(65) Prior Publication Data

US 2012/0034816 A1 Feb. 9, 2012

(51) Int. Cl.
*H01R 13/72* (2006.01)

(52) U.S. Cl. ...................................................... 439/501

(58) Field of Classification Search .................. 439/501, 439/4; 191/12.4
See application file for complete search history.

(56) References Cited

U.S. PATENT DOCUMENTS

| | | | | | |
|---|---|---|---|---|---|
| 2,979,576 | A | * | 4/1961 | Huber | 191/12.4 |
| 4,206,409 | A | * | 6/1980 | McKinney | 455/345 |
| 5,361,879 | A | * | 11/1994 | Lin | 191/12.4 |
| 5,422,957 | A | * | 6/1995 | Cummins | 381/384 |
| 5,690,198 | A | * | 11/1997 | Lohr | 191/12.2 R |
| 6,379,178 | B1 | * | 4/2002 | Jones et al. | 439/501 |
| 6,612,875 | B1 | * | 9/2003 | Liao | 439/675 |
| 7,293,888 | B2 | | 11/2007 | Hutzel et al. | |
| 7,399,198 | B2 | | 7/2008 | Thalheimer et al. | |
| 2003/0085621 | A1 | | 5/2003 | Potega | |
| 2005/0151422 | A1 | | 7/2005 | Gilmour | |
| 2005/0255898 | A1 | | 11/2005 | Huang | |
| 2007/0258204 | A1 | | 11/2007 | Chang et al. | |
| 2008/0291786 | A1 | | 11/2008 | Bruns et al. | |

* cited by examiner

*Primary Examiner* — Phuong Dinh
(74) *Attorney, Agent, or Firm* — Dinsmore & Shohl LLP

(57) ABSTRACT

A vehicular retractable cable system may include a housing and a cable assembly including a retract assembly with associated retractable cable. The cable has extended and retracted positions. A position setting assembly is associated with the cable assembly. The position setting assembly has a retract button, wherein when the cable is in an extended position and upon activation of the retract button, the cable moves toward the retracted position.

18 Claims, 7 Drawing Sheets

VEHICULAR RETRACTABLE CABLE SYSTEMS

TECHNICAL FIELD

The present specification generally relates to retractable auxiliary cable systems for connection of portable digital musical players in vehicles.

BACKGROUND

Various advancements in the area of portable audio devices, e.g., cell phones, smart phones or personal digital assistants (PDAs), mp3/mp4 players, etc., include the storage of digital music files onto the devices. Playback of the music can occur through connecting the portable device to an external source, such as a vehicular entertainment system (e.g., audio speaker and control system, etc.). While some vehicles have an auxiliary input connector to link a portable device to the speaker system, the auxiliary connectors are often rigidly secured to the vehicle at a fixed location (i.e., the auxiliary connectors are not adjustable), and hence, these auxiliary connectors do not allow a passenger to place the portable device in a variety of locations within the vehicle. In addition, because such auxiliary connectors are not adjustable, the auxiliary connectors can be undesirably exposed.

Accordingly, a need exists for retractable auxiliary cable systems for use in vehicles to connect a portable electronic device in conjunction with a vehicle's entertainment system.

SUMMARY

In one embodiment, a vehicular retractable cable system may include a housing, a cable assembly comprising a retract assembly with associated retractable cable, the cable having extended and retracted positions, a position setting assembly associated with the cable assembly, the position setting assembly having a retract button, wherein when the retract button is activated, the cable moves to an extended position or a retracted position.

In another embodiment, a vehicular retractable cable system may include a housing, a cable assembly comprising a retract assembly with associated retractable cable, the cable having extended and retracted positions, a position setting assembly associated with the cable assembly, the position setting assembly having a retract button; wherein when the cable is in an extended position and upon activation of the retract button, the cable moves toward the retracted position.

In another embodiment, a vehicle includes a housing structure having an opening and a vehicular retractable cable system. The vehicular retractable cable system including a housing located in the opening and a cable assembly comprising a retract assembly in the housing associated retractable cable, the cable having extended and retracted positions. A position setting assembly is associated with the cable assembly where the position setting assembly has a retract button. When the cable is in an extended position and upon activation of the retract button, the cable moves toward the retracted position and the housing structure.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein include a vehicular retractable cable system for connecting portable audio devices having digital music stored to a vehicle so that music may be played using the vehicle's entertainment system. The vehicular retractable cable system may generally comprise a cable assembly with an associated retractable cable, the cable having extended and retracted positions, and a retract assembly associated with the cable assembly, the retract assembly having a retract button. When the retract button is activated, the cable may move toward an extended position or a retracted position. Various embodiments of the vehicular retractable cable system and its use will be described in more detail herein.

Figure 1:
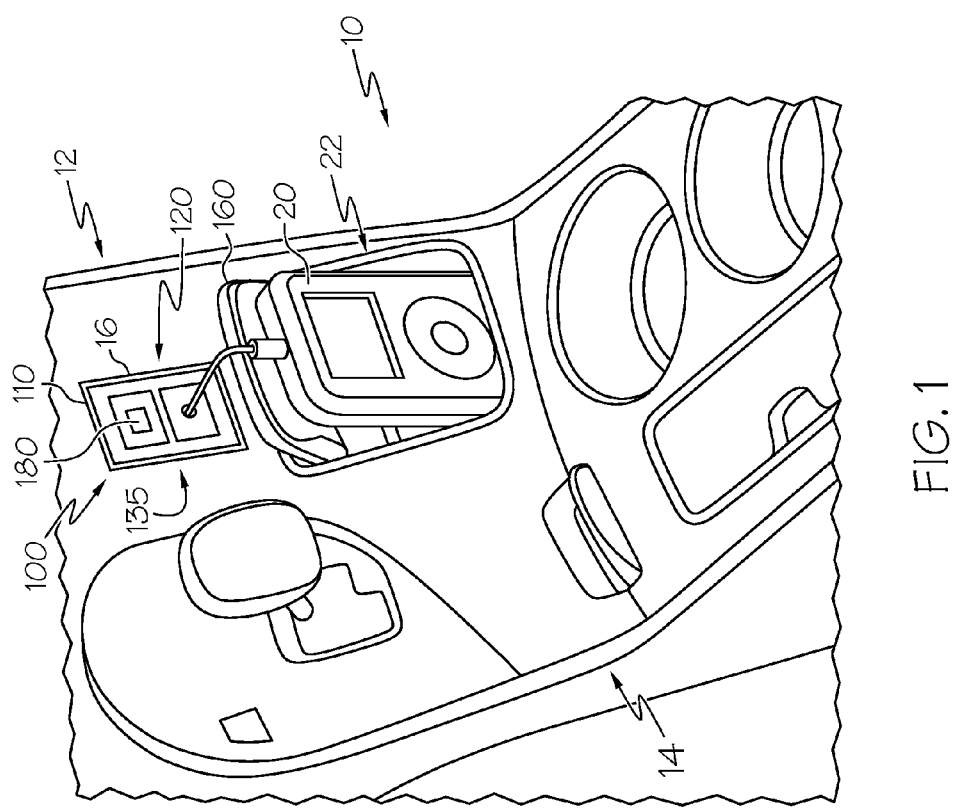
FIG. 1 depicts a driver's compartment of a vehicle according to one or more embodiments shown and described herein.

Referring to FIG. 1, an exemplary embodiment of a vehicular retractable cable system 100 is illustrated mounted within a housing structure 12 of a vehicle 10. For example, the housing structure 12 may be a console 14 or some other structure anterior of the console 14, such as a dashboard. In the illustrated embodiment, the vehicular retractable cable system 100 is mounted within an opening 16 in the console 14. Other suitable mounting locations for the vehicular retractable cable system 100 include doors (rear and/or front), rear consoles, overhead compartments, seats, etc.

In some embodiments, the vehicular retractable cable system 100 may be a modular system including a housing 110 that is sized and configured to be fit into the opening 16 during assembly of the vehicle 10. In these embodiments, the housing 110 may be received within the opening 16 of the housing structure 12 of the vehicle 10. In some embodiments, the retractable cable system 100 may be removable from the housing structure 12. In other embodiments, the retractable cable system 100 may be integral and not readily removable from the housing structure 12.

The vehicular cable system 100 may include a cable assembly 120 and a position setting assembly 135. The cable assembly 120 includes a cable 160 that is retractable relative to the housing 110, using a retract assembly (e.g., a ratchet, motor, etc.). The position setting assembly 135 includes an input 180 (e.g., such as a button) that can be used to lock the cable 160 in a plurality of incrementally extended positions. In the illustrated example, the cable 160 is connected to a portable audio device 20 that is received within a holder 22 provided in the console 14.

Figure 2:
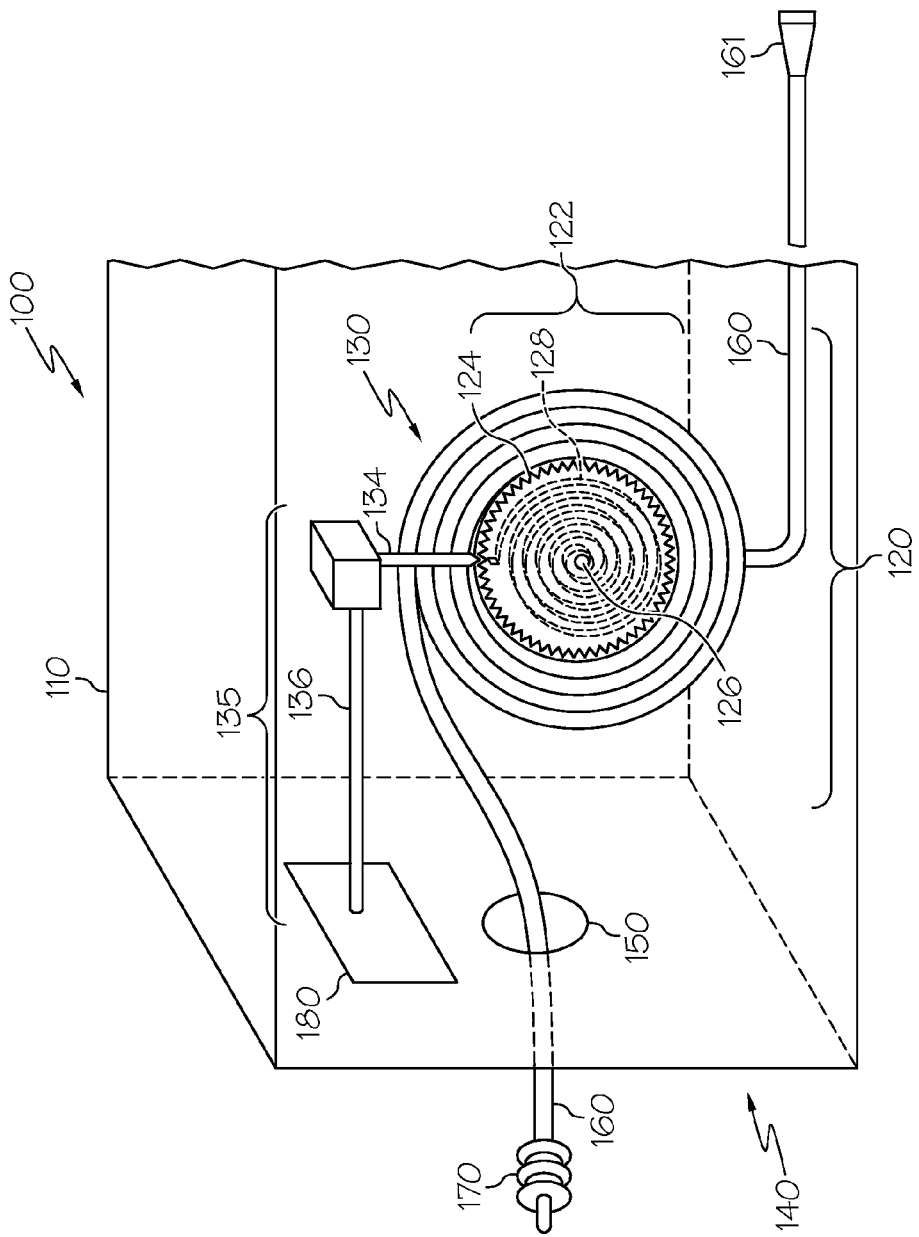
FIG. 2 depicts a front view of a vehicular retractable cable system according to one or more embodiments shown and described herein.
Figure 3:
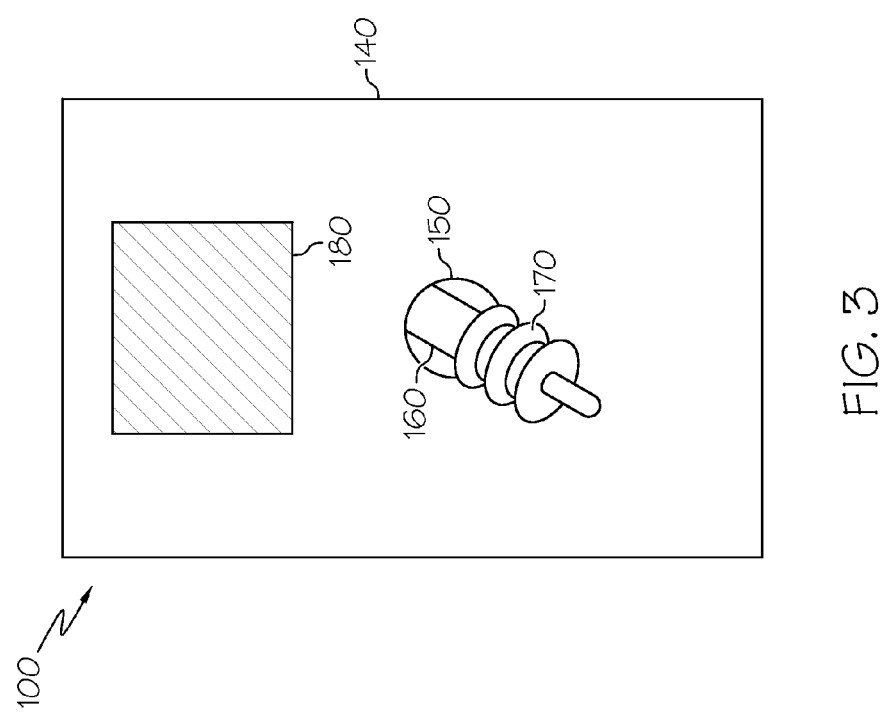
FIG. 3 depicts a side cross-sectional view of a cable assembly according to one or more embodiments shown and described herein.

Referring to FIGS. 2 and 3, a diagrammatic, interior view of the vehicular retractable cable system 100 is illustrated. The system 100 may have the housing 110. Housing 110 may hold the cable assembly 120, the retract assembly 130 and the position setting assembly 135, as will be more fully discussed herein. As illustrated in FIG. 1, housing 110 may comprise a front panel 140. Panel 140 comprises an opening 150 for movement of the retractable cable 160 into and out of the housing 110, and also for actuation of a retract button 180. Cable 160 is shown in one of a plurality of incrementally extended positions. FIG. 3 depicts an exemplary front view of front panel 140. Cable 160 is shown in a retracted position in FIG. 3.

To use the vehicular retractable cable system 100 as described herein, a user may pull cable 160 to unwind the cable 160 from reel 124 until a desired length of cable 160 is unwound. A catch lever 134 can lock the reel 124 in place to prevent cable 160 from retracting into housing 110. The catch lever 134 can automatically lock reel 124 into place or can manually lock reel 124 into place by activating retract button 180. After cable 160 is unwound to a extended position, plug 170 can be plugged into a portable electronic device for use with a vehicular entertainment system.

To store cable 160, plug 170 would be unplugged from the portable electronic device. The user may then activate retract button 180 to release catch lever 134 allowing cable 160 to retract into housing 110. The cable 160 is wound around reel 124 until it is returned to a retracted position.

In another example for using vehicular retractable cable system 100, a user may activate retract button 180 to unwind cable 160 from reel 124 until a desired length of cable 160 is reached. Retract button 180 is activated twice to lock the reel 124 in place to prevent further cable movement. Cable 160 is in an extended position, and plug 170 can be plugged into a portable electronic device for use with a vehicular entertainment system. To store cable 160, plug 170 would be unplugged from the portable electronic device. The user may then activate retract button 180 to wind cable 160 onto reel 124 until cable 160 is returned to a retracted position. Of course, various other ways of using the vehicular retractable cable system will be apparent to those of ordinary skill in the art in view of the teachings herein.

Figure 4:
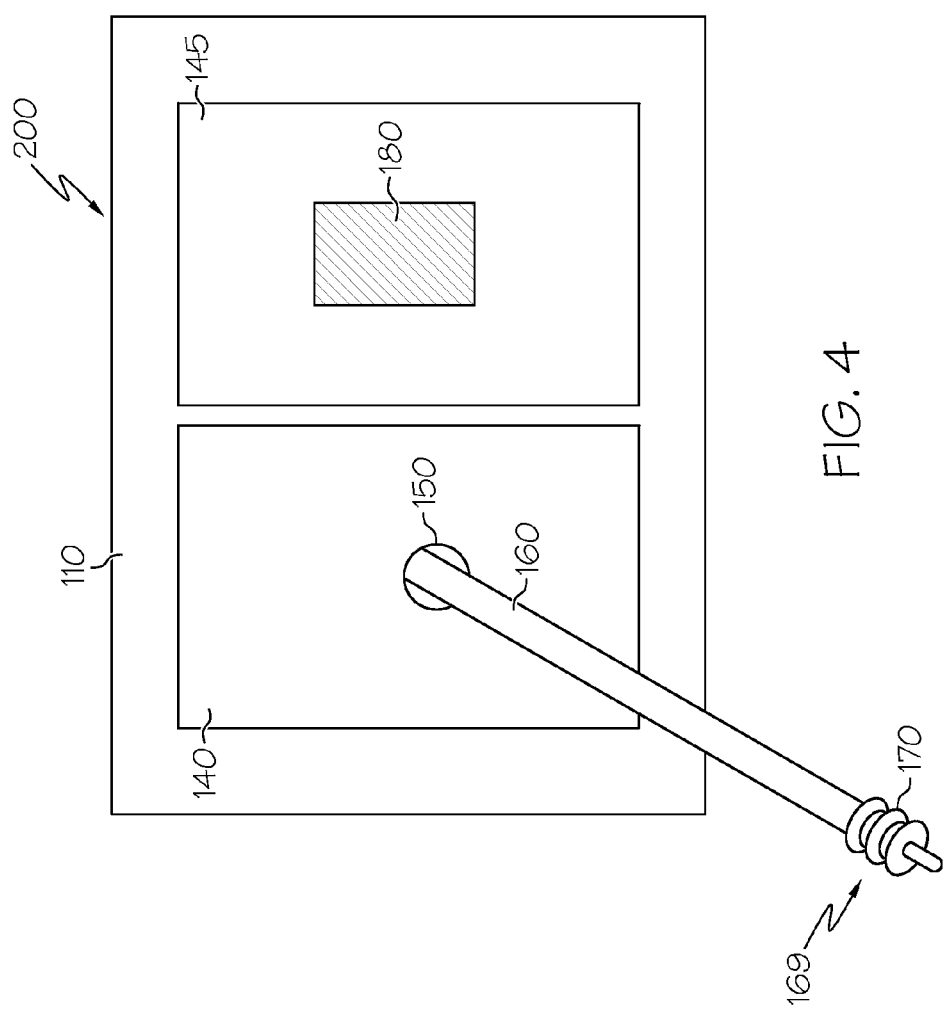
FIG. 4 depicts a top view of a vehicular retractable cable system according to one or more embodiments shown and described herein.

FIG. 4 depicts another exemplary vehicular retractable cable system 200 housing a horizontal configuration. System 200 may comprise many of the features described above such as a housing 110 having a panel 140. Panel 140 comprises an opening 150. Opening 150 allows for movement of a retractable cable 160 into and out of housing 110. Cable 160 is shown in one of a plurality of extended positions. Housing 110 may also comprise a second panel 145. Second panel 145 may comprise a retract button 180. The retract button 180, when activated, can be used to move and/or lock the cable to a plurality of incremental extended positions at any length the user desires or to a hideaway retracted position. When the retract button 180 is activated twice, the cable can be placed in a stationary position so that a desired length of retractable cable can be achieved. Activation of retract button 180 twice can disable movement of retractable cable 160 into or out of housing 110.

It should be understood that the housing 110 and panels 140 of systems 100 and 200 may have various other configurations, depending on the particular application of the vehicular retractable cable system. For example, the housing can be square, rectangular, circular, irregular-shaped, etc. and sized to hold, in one embodiment, one or both of a cable assembly and a retract assembly. In addition, it should be understood that the housing may encompass part or all of the cable assembly and retract assembly. Similarly, the panel associated with the housing may comprise one or more openings at any position along the panel for movement of a cable, and if desired on the same panel, placement of a retract button.

It should be further understood that retractable cable can be an auxiliary cable, a USB cable, mp3 player adapter, or any other cord capable of transmitting an electric signal and/or providing power to an electronic device. In addition, the cable can vary in length as needed to reach various positions within the interior of the vehicle.

Referring now to FIGS. 2-4, the opening 150 may have a smooth surface to prevent abrasion and damage to the cable 160. Retractable cable 160 may comprise a plug 170 for connection to a portable audio device. Opening 150 may be sized so that cable 160 may easily pass through opening 150, but plug 170 may not pass through when retractable cable 160 is retracting. Thus, the plug 170 is configured to prevent the cable 160 from fully retracting into the housing. Alternatively, the opening 150 may be sized so that the retractable cable 160 and plug 170 may fully retract through opening 150 and completely into housing 110. As illustrated in FIG. 1, cable 160 is in one of a plurality of extended positions. As illustrated in FIGS. 1 and 4, cable 160 is in various extended positions.

Systems 100 and 200 comprise the cable assembly 120 in association with the position setting assembly 135 and the retract assembly 130. The retract assembly 130 may comprise a reel assembly 122 with the associated retractable cable 160 adapted to extend outwardly therefrom to one of a plurality of incrementally extended positions. The retract assembly 130 may be mounted to the housing 110. Reel assembly 122 may comprise a reel 124 that is rotatably mounted on a shaft 126. Shaft 126 may be attached to housing 110. A spring 128 is located within reel 124 and drives reel 124 to rewind the cable 160 thereon. Cable 160 may have a first end 161 that may be coupled to a vehicular entertainment system. The retractable cable can be coupled to the vehicle's entertainment system either directly or through one or more intermediate components (e.g., wire harness system, etc.). The cable 160 is wound about reel 124. A length of cable 160 having a second end 169 can extend outwardly of the opening 150 in panel 140 of housing 110. The second end 169 of the cable 160 has a plug 170 secured thereto.

Figure 5:
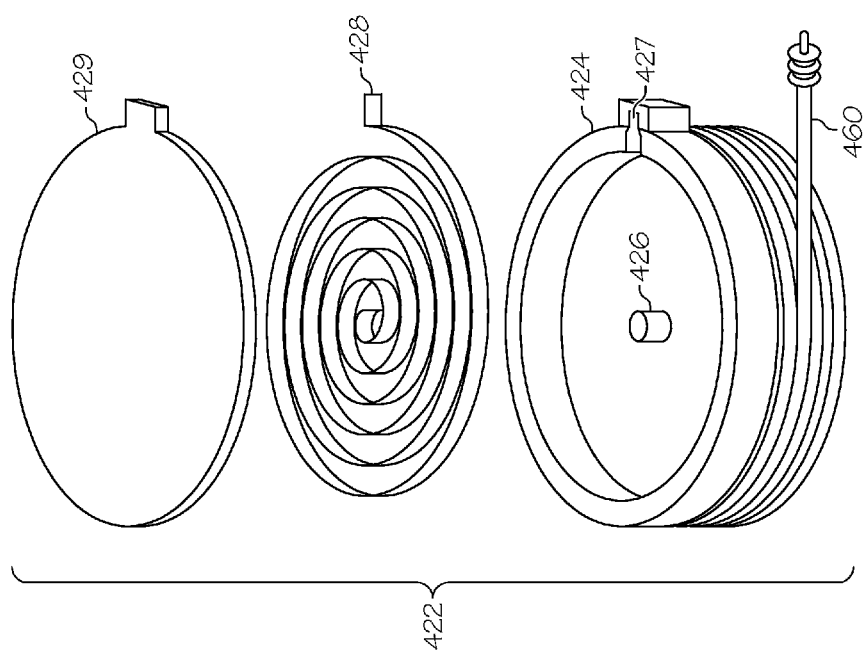
FIG. 5 depicts an exploded view of an exemplary retract assembly according to one or more embodiments shown and described herein.

An exemplary reel assembly 422 is shown in FIG. 5. Reel assembly 422 is spring-driven and comprises a reel 424, a spring 428, and a cover 429. Reel 424 can comprise a compartment and is supported on and rotates around a shaft 426 that extends into the compartment of reel 424. Cable 460 is wound around reel 424. The spring 428 is contained in the compartment of reel 424 and is lockingly engaged with shaft 426 at one end of spring 428. The other end of spring 428 is secured in a recess 427 in reel 424. The spring 428 is contained within the compartment of reel 424 by cover 429. Spring 428 imparts a rotational tendency to reel 424 to permit the retraction of cable 460.

Spring 428 may be fabricated by known techniques from spring steel, or other metals or polymer materials may be used. The cable 460 is coiled around the reel 424, and when cable 460 is pulled from its retracted (rest) position to a location in the vehicle, the reel 424 rotates and winds the spring 428 under tension so that its tendency is to pull the cable 460 back into its retracted (rest) position under a light to moderate spring force. This allows the cable to be returned easily without the user having to stuff slack cord into the housing.

Figure 6:
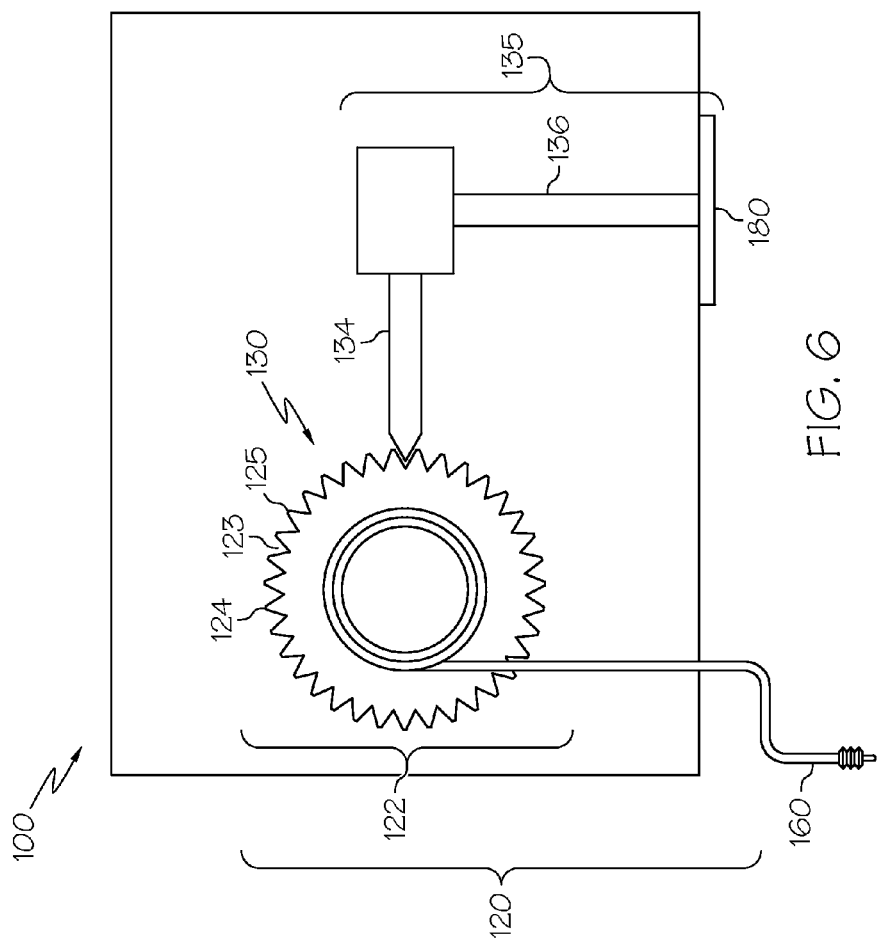
FIG. 6 depicts a front view of a vehicular retractable cable system according to one or more embodiments shown and described herein.

An exemplary cable assembly 120 in association with position setting assembly 135 are depicted in FIG. 6. Cable assembly 120 may comprise a reel assembly 122 associated with a retractable cable 160, which is shown in a extended position. As shown in FIG. 6, the reel assembly 120 may include the reel 124 around which cable 160 is wound. As discussed above, reel 124 can comprise a compartment housing a spring that imparts a rotational tendency to reel 124. Reel 124 may also be provided with notches 123 and teeth 127.

The position setting assembly 135 may comprise a retract button 180. Retract button 180 can comprise a push button. Various other buttons may be used as well. For example, a slidable button or a switch may be provided that slides to a position that allows extension of cable 160 and/or slides to a position that causes retraction of cable 160.

The position setting assembly 135 may also comprise a catch lever 134 and push pin 136. The catch lever 134 may move axially and is adapted to engage notches 123 and restrain rotation of reel 124. Catch lever 134 may allow for cable 160 to be freely pulled from the reel 124, without encountering resistance from catch lever 134. When a desired length of cable 160 has been pulled, catch lever 134 can automatically lock reel 124 into place. Alternatively, catch lever 134 can manually engage reel 124 by activation of retract button 180.

A push pin 136 is in mechanical communication with catch lever 134. Push pin 136 can be connected to catch lever 134 through a cam or other mechanical linkages that can translate linear motion in one direction to a direction at a right angle. Push pin 136 is configured to move lever 134 into a desired position. An exemplary desired position may be to move catch lever 134 so as to engage notches 123. Another exemplary desired position may be to move catch lever 134 so as to disengage lever 134 from notches 123. Other suitable ways in which push pin 136 may engage catch lever 134 will be apparent to those of ordinary skill in the art in view of the teachings herein.

Figure 7:
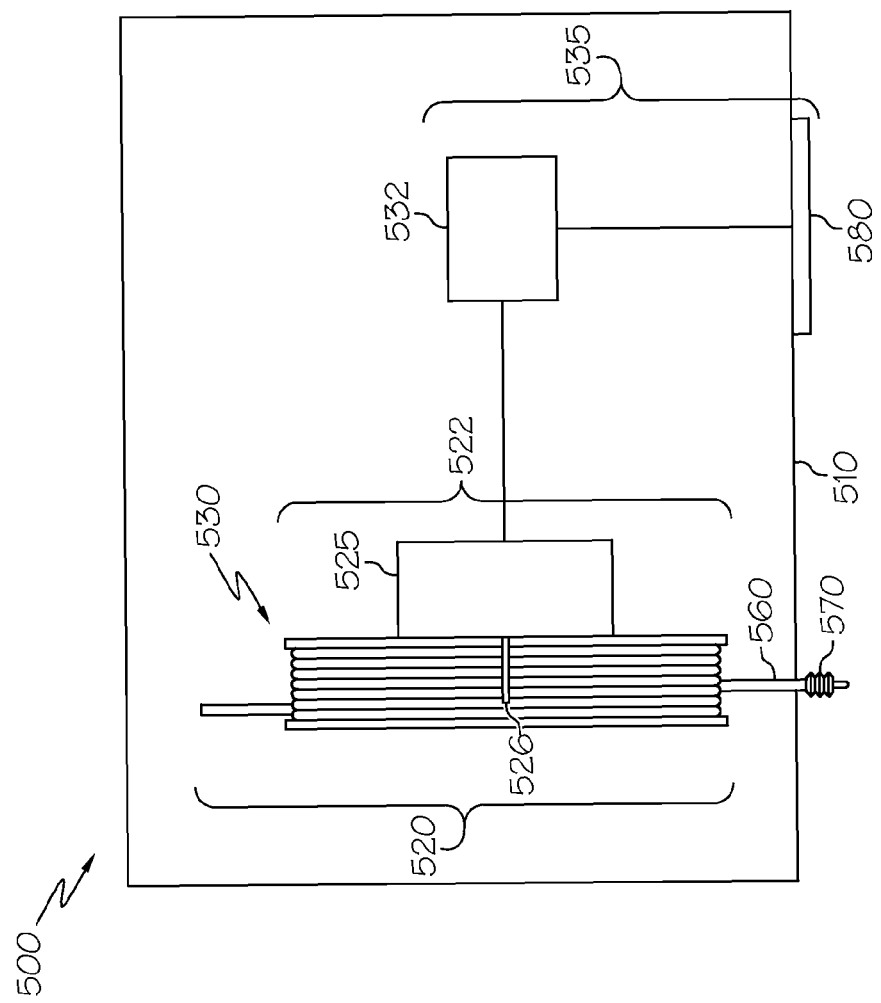
FIG. 7 depicts a side view of a vehicular retractable cable system according to one or more embodiments shown and described herein.

Referring to FIG. 7, another exemplary vehicular retractable cable system includes many of the features described above such as a cable assembly 500 in association with a position setting assembly 535. Cable assembly 520 may comprise a reel assembly 522 associated with the retractable cable 560, which is shown in a retracted position. As shown in FIG. 7, the reel assembly 522 may include a reel 524 around which cable 560 is wound. Reel assembly 522 may also comprise a motor 525. Motor 525 may be coupled to a drive shaft 526 upon which reel 524 may be mounted. Motor 525 may be mounted on the housing. As drive shaft 526 rotates, reel 524 rotates and can provide movement of cable 560 into and out of housing 510.

The motor 525 can rotate the reel 524 in a first direction to wind the cable 560 about the reel 524. Motor 525 can also impart a rotational tendency to reel 524 in a second direction opposite the first direction to unwind cable 560 about reel 524. Alternatively, motor 525 may rotate in a second direction opposite the first direction to disengage the motor 525 from the reel 524 allowing an operator to rotate reel 524 in the second direction manually by pulling cable 560. The motor 525 may be powered by a vehicle battery or may be powered by other means apparent to those of ordinary skill in the art in view of the teachings herein.

Alternatively, the reel assembly may include any known rotating device, for example, a spring, hand crank, ratchet, etc. coupled to the reel 524. Various suitable ways in which a reel assembly may rotate in both directions to extend or retract a cable will be apparent to those of ordinary skill in the art in view of the teachings herein.

The position setting assembly 535 may comprise a retract button 580. The position setting assembly 535 may also comprise a switch 532. Switch 532 is in electrical connection with retract button 580. Switch 532 is also in electrical connection to motor 525. Retract button 580 is used for controlling the switch 532 for driving the motor 525 and controlling power to the motor 525. Switch 532 activates motor 525 to rotate reel 524, thereby extending or retracting associated retractable cable 560. Upon completion of retraction, switch 532 can shut off power to the motor 525 automatically. Switch 532 can also shut off power to the motor 525 manually through activation of retract button 580.

The retract button can be activated by pushing or depressing the retract button. Of course, various other configurations or ways exist in which a retract button may be activated will be apparent to those of ordinary skill in the art in view of the teachings herein. In one example, a retract button 580 may be provided such that, when pushed, it allows cable 560 and plug 570 to be extended. When the button 580 is released, the cable 560 is locked in that it cannot be extended anymore. When the button 580 is pushed again, cable 560 and plug 570 may be retracted into housing 510. Alternatively, a retract button 580 may be provided such that, when pushed and released, it allows cable 560 and plug 570 to be extended. When button 580 is pushed a second time, the cable 560 is locked in that it cannot be extended anymore. When button 580 is pushed again, cable 560 and plug 570 may be retracted into housing 510. Those of ordinary skill in the art in view of the teachings herein will appreciate other suitable ways of using devices to extend and retract cable 560. For example, the button may be any release mechanism that allows extension of cable 560 and causes retraction of cable 560.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicular retractable cable system comprising:
 (a) a cable assembly comprising a retract assembly with associated retractable cable, the cable having extended and retracted positions; and
 (b) a position setting assembly associated with the cable assembly, the position setting assembly including a retract button and a catch lever actuated by the retract button, wherein upon a first activation of the retract button, the cable is free to move towards one of the extended position or the retracted position, and upon a second activation of the retract button, the catch lever locks the cable into one of a plurality of incrementally extending positions between the extended position and the retracted position and prevents the cable from extending or retracting.

2. The system of claim 1, wherein when the cable is in the extended position and upon activation of the retract button, the cable moves toward the retracted position.

3. The system of claim 1, wherein when the cable is in the retracted position and upon activation of the retract button, the cable moves toward the extended position.

4. The system of claim 1, wherein when the retract button is activated twice, the cable is placed in a stationary position so that a desired length of retractable cable can be achieved.

5. The system of claim 1, wherein the retractable cable has a first end coupled to a vehicular entertainment system.

6. The system of claim 1, wherein the retractable cable has a second end having a plug secured thereto, said plug configured to prevent the cable from fully retracting into the housing.

7. The system of claim 1, wherein the retract assembly is spring-driven.

8. The system of claim 1, wherein the retract assembly is motor-driven.

9. A vehicular retractable cable system comprising:
   (a) a cable assembly comprising a retract assembly with associated retractable cable, the cable having extended and retracted positions;
   (b) a position setting assembly associated with the cable assembly, the position setting assembly having a retract button and a catch lever actuated by the retract button;
   wherein when the cable is in the extended position and upon a first activation of the retract button, the catch lever locks the cable into one of a plurality of incremental extending positions between the extended position and the retracted position, and prevents the cable from extending or retracting, and upon a second activation of the retract button, the cable is pulled towards the retracted position.

10. The system of claim 9, wherein the retractable cable has a first end coupled to a vehicular entertainment system.

11. The system of claim 9, wherein the retractable cable has a second end having a plug secured thereto, said plug configured to prevent the cable from fully retracting into the housing.

12. The system of claim 9, wherein the retract assembly is spring-driven.

13. The system of claim 9, wherein the retract assembly is motor-driven.

14. A vehicle comprising:
    a housing structure having an opening;
    a vehicular retractable cable system comprising:
        a housing located in the opening;
        a cable assembly comprising a retract assembly in the housing associated retractable cable, the cable having extended and retracted positions; and
        a position setting assembly associated with the cable assembly, the position setting assembly having a retract button and a catch lever actuated by the retract button;
    wherein when the cable is in the extended position and upon a first activation of the retract button, the catch lever locks the cable into one of a plurality of incremental extending positions between the extended position and the retracted position, and prevents the cable from extending or retracting; and upon a second activation of the retract button, the cable is pulled towards the retracted position and the housing structure.

15. The vehicle of claim 14, wherein the retractable cable has a first end coupled to a vehicular entertainment system.

16. The vehicle of claim 15, wherein the retractable cable has a second end having a plug secured thereto, said plug configured to prevent the cable from fully retracting into the housing.

17. The vehicle of claim 14, wherein the retract assembly is spring-driven.

18. The vehicle of claim 14, wherein the retract assembly is motor-driven.

* * * * *